United States Patent
De La Fuente Jiménez et al.

(10) Patent No.: US 7,030,061 B2
(45) Date of Patent: Apr. 18, 2006

(54) PRODUCTIVE PROCESS FOR MANUFACTURING AN ALGAL SPECIES-BASED ORGANIC COMPLEMENT FOR VEGETAL FERTILIZATION

(75) Inventors: Lucía E. De La Fuente Jiménez, Osorno (CL); Alejandro E. Santibáñez Handschuh, Puerto Varas (CL)

(73) Assignee: Universidad De Los Lagos, Osorno (CL)

( * ) Notice: Subject to any disclaimer, the term of this patent is extended or adjusted under 35 U.S.C. 154(b) by 167 days.

(21) Appl. No.: 10/707,743

(22) Filed: Jan. 8, 2004

(65) Prior Publication Data
US 2004/0144144 A1    Jul. 29, 2004

(30) Foreign Application Priority Data
Jan. 8, 2003    (CL) .................................... 24-2003

(51) Int. Cl.
*A01N 63/00*   (2006.01)
*A01N 59/00*   (2006.01)
*C05F 11/00*   (2006.01)
*C05F 11/10*   (2006.01)
*C05B 11/04*   (2006.01)

(52) U.S. Cl. .................... 504/117; 504/116; 504/128; 504/136; 504/138; 71/11; 71/15; 71/16; 71/23; 71/37

(58) Field of Classification Search ............ 71/11, 71/15, 16, 23, 37, 42; 504/116, 117, 118, 504/123, 136, 138
See application file for complete search history.

(56) References Cited

U.S. PATENT DOCUMENTS

| | | | | |
|---|---|---|---|---|
| 2,036,934 A | * | 4/1936 | Green | 536/3 |
| 3,396,158 A | * | 8/1968 | Haug | 536/3 |
| 3,948,881 A | * | 4/1976 | Strong | 536/2 |
| 4,846,870 A | | 7/1989 | Weltzien et al. | |
| 4,919,702 A | | 4/1990 | Weltzien et al. | |
| 5,071,462 A | | 12/1991 | Kimura | |
| 5,093,262 A | | 3/1992 | Kimura | |
| 5,676,727 A | | 10/1997 | Radlein et al. | |
| 6,083,293 A | | 7/2000 | Bath | |

OTHER PUBLICATIONS

Lahaye, et al. Cell-wall polysaccharides from the marine green alga Ulva "rigida" (Ulvales, Chlorophyta)- NMR analysis of ulvan oligosaccharides. Carbohydrate Research 1996, 283, 161-173.*

* cited by examiner

*Primary Examiner*—John Pak
*Assistant Examiner*—Ernst Arnold
(74) *Attorney, Agent, or Firm*—Daniel F. Nesbitt; Hasse & Nesbitt LLC

(57) ABSTRACT

An organic complement for fertilizing vegetable species, as an organic product which fulfills with the features of a growth stimulator, mainly manufactured from green algae (*Ulva rigida*) and brownish algae (*Macrocystis pyrifera*). The invention includes a process for obtaining the complement that requires washing, grinding, acid and alkaline digestion, filtering and packaging steps. The most important used supplies are hydrochloric and phosphoric acid, and potassium carbonate. The product allows to improve the absorption efficiency of the nutrients supplied by the fertilizers, guaranteeing an optimal growth for the plant species, achieving a higher production in a short period of time. The product is biodegradable and beneficial for soils.

21 Claims, 3 Drawing Sheets

PRODUCTIVE PROCESS FOR MANUFACTURING AN ALGAL SPECIES-BASED ORGANIC COMPLEMENT FOR VEGETAL FERTILIZATION

BACKGROUND OF INVENTION

The increased demand for organic fertilizers in developed countries and the current tendency to its sustainability regarding the industrial wastes management, which minimizes the environmental impacts, are situations considered as relevant. In this context, it is envisaged to provoke a positive environmental impact generating a productive alternative directed to the use of low commercial value algae for the production of a complement for organic fertilization.

SUMMARY OF INVENTION

The features of this organic growth complement are based on function of the marine algae contributions, which comprise a wide range of mineral elements, aminoacids, vitamins and auxin- and cytokinin-type phytohormones.

The resulting product contains these elements in an active form, therefore, a higher plant production and/or better yielding can be obtained when it is supplemented to plant crops with a basal fertilization suitable for the vegetal type. Furthermore, this product fulfills or meets the following organic standards: EU N°2092/1; USDA/NOP Final rule (USA), and the JAS Japanese Agricultural standard for Organic Agricultural Products (Japan).

This organic complement for basal fertilization allows better seed germination, an increase in root development, a faster and more uniform plant stabilisation, an increase in the nutrients absorption, a more efficient nutrients exploitation, tissue composition improvements, higher resistance to frost, higher resistance to drought and a faster recovery, higher resistance to diseases and plagues (by fungi and insects), and longer shelf-life.

The term "basal fertilization" is understood as the soil fertilization necessary to be applied to a soil once checked, the soil being in need of macronutrients (nitrogen, phosphorus and potassium) and micronutrients (molybdenum, magnesium, boron, etc.) considering the vegetal type to be growth.

Applying this product as a fertilization complement achieves a maximum effect within a monitored fertilization program, with a constant soil analysis. Using this product, soils do not require (as usually) an over-dosage, since a minimal but exact fertilizer contribution is enough in order to achieve optimal yields.

Furthermore, it is important to note that the obtained "organic product" as prepared from raw organic matter consisting of "organic" sources, through the process herein described, allows to provide a fertilizer complement for plant growing that is certifiable for use for organically grown food crops.

DETAILED DESCRIPTION

The present invention provides an organic fertilizer complement, its method of making the fertilizer complement. The organic fertilizer complement is manufactured from green algae (*Ulva rigida,* hereinafter "*ulva*") and brownish algae (*Macrocystis pyrifera,* hereinafter "*macrocystis*"). The organic product provides features of a vegetal growth stimulator for plants. The product provides improved absorption efficiency of the nutrients supplied by the fertilizers, guaranteeing an optimal growth for the plant species, and achieving higher production in a short period of time. the product is biodegradable and beneficial for soils.

The process for obtaining the fertilizer complement from the *ulva* and *macrocystis* typically includes the steps of washing, grinding, acid and alkaline digestion, filtering and packaging. Typical other raw materials are inorganic acids and salts, such as hydrochloric and phosphoric acid, and potassium carbonate.

Figure 1:
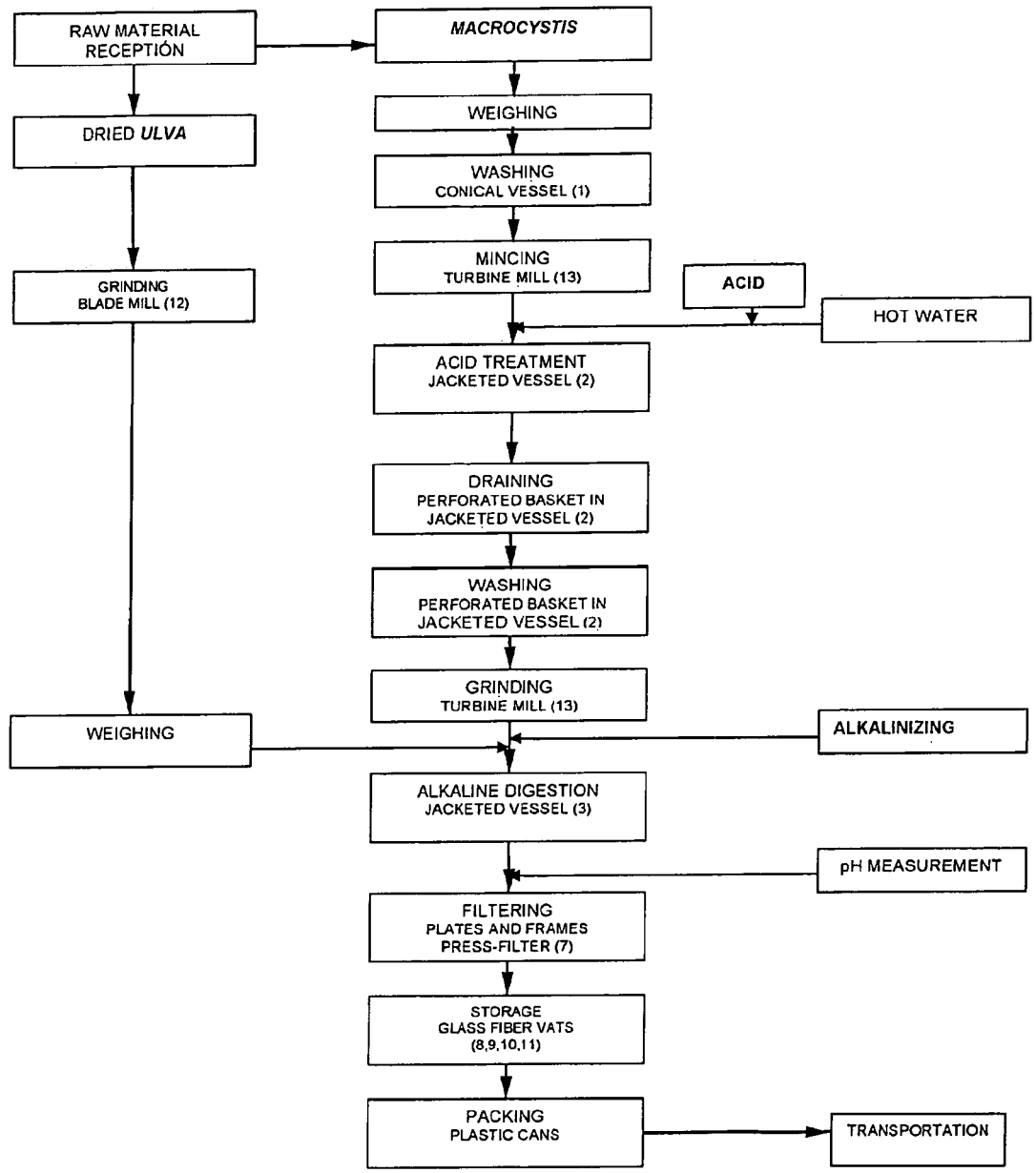
FIG. 1 shows a flow chart of a typical process for making the organic fertilizer complement.
Figure 2:
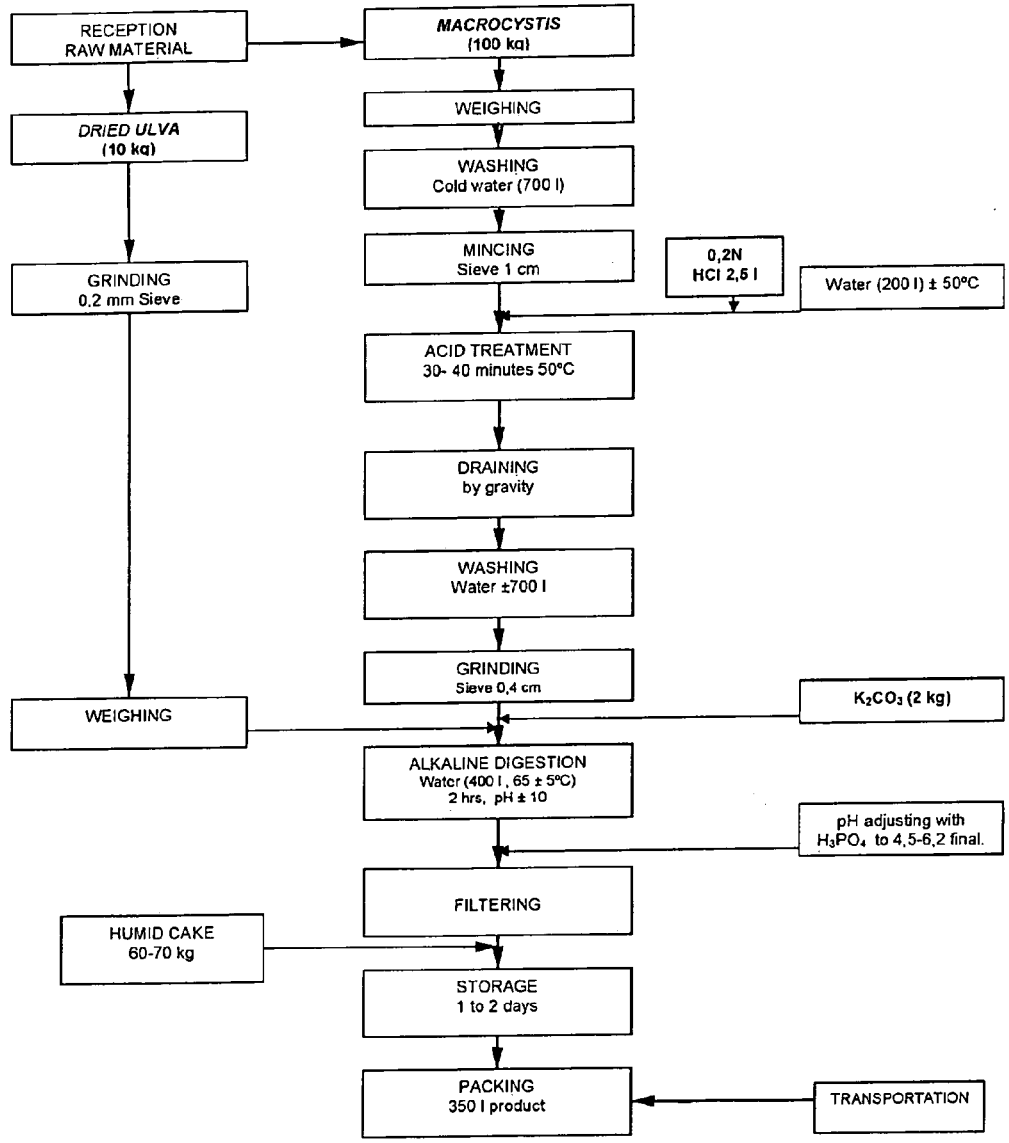
FIG. 2 shows a mass balance and process condition flow chart for the manufacture of an organic fertilizer complement embodiment of the invention.
Figure 3:
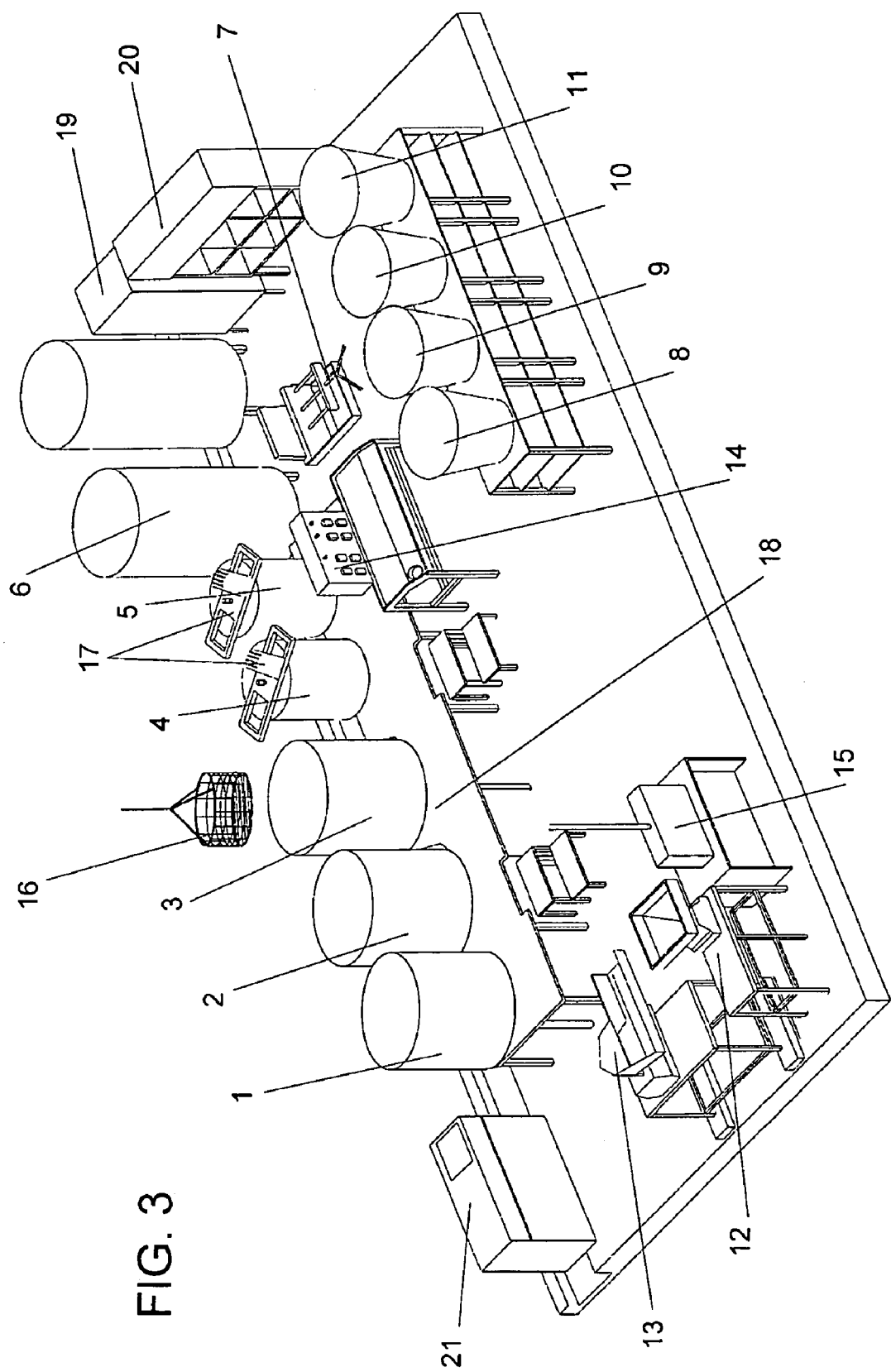
FIG. 3 shows a typical processing equipment system for producing the organic complement.

FIG. 1 shows a flow chart of the steps of a process for making the organic fertilizer complement. FIG. 2 shows a flow chart showing the mass balance and process conditions for an embodiment of the process of the invention. FIG. 3 shows a typical process equipment system used to process the fertilizer complement.

The typical production process for the manufacture of the organic fertilizer complement for fertilization is described as follows: Raw Materials Reception: Fresh, whole *Macrocystis,* previously washed with salted water in order to remove sand and foreign organisms, is received. *Ulva* is received, dried and minced. Both raw materials must be in good conditions and without malodors or other strange odors. Any equipment items used in the description below are shown in parenthesis and referenced in FIG. 3.

Grinding: The dried *Ulva* is ground to about 0.2 mm in a blade mill (12) for achieving good homogenization when later admixed with the *Macrocystis* during the alkaline digestion step, described below.

Weighing: The fresh alga *Macrocystis* and the ground and dried alga *Ulva* are weight into portions at a weight ratio of 1:1 on a fresh algae base. The weight ratio can vary up to 10:1 if dried *Ulva* is used.

Washing: The fresh alga *Macrocystis* is placed in the perforated basket (16), and immersed into a conical vessel (1) containing cold tap water. This operation is repeated until it is established that the *Macrocystis* is clean and that the salts have been removed satisfactorily. A checking of the salt removal can typically be carried out by pouring about 20 ml of washing liquid in a tube and adding 3 drops of $AgNO_3$. If a white precipitate forms, then excessive salts are still present. This operation and the checking are carried out until the precipitate formed is minimal. Alternative means of checking can include a batch or continuous analysis of the electric conductivity of the washing liquid using instrumentation that are well known to those skilled in the art. For accelerating the washing process at the time of draining the vessel, water can be sprayed.

Mincing: The washed alga *Macrocystis* is then minced in a turbine mill (13) until a typical particle size of about 1 cm diameter is achieved. The minced algae is subsequently placed in a perforated basket (16). This step has as a first objective to facilitate the handling of the alga during the process, and as a second objective to achieve a particle size which allows the subsequent reagents to uniformly penetrate within the alga, thus achieving more homogeneous reactions and better control of the chemical treatment.

Acid Treatment: The perforated basket with the minced *Macrocystis* is immersed in the jacketed vessel (2) containing, per 1 Kg of *Macrocystis*, 2 parts by weight of water and 25 ml of 0.2 N HCl, for 30–40 minutes at ±50° C. under constant stirring (mixer 17). This treatment removes the mineral salts and the excess soluble organic material which was not removed in the previous washing step, as well as the sediments and organisms associated with the raw algae. An ionic exchange chemical reaction is carried out, principally between the calcium ions and other divalent ions as magnesium and strontium contained in the algae as the corresponding divalent metal alginate, thus producing alginic acid (HAlg), which is removed from the algae into the acid liquid.

The chemical reaction is as follows:

$$Ca(Alg)_2 + 2HCl \rightarrow 2HAlg + CaCl_2$$

Draining: To carry out the residual liquid and solid separation, the perforated basket (16) is raised out of the jacketed vessel (2), leaving the acidic liquid to drain by gravity.

Washing: The resulting drained solids are washed with cold water, such as by spraying water through a hose into the basket containing the algae, for complete removal of the alginic acid.

Grinding: The washed algae *Macrocystis* is ground in the turbine mill (13) having a sieve that has 0.4 cm holes, for mechanically reducing the algal particles to assist in their dissolution during the subsequent digestion step; thus, the smaller the particle size, the more effective shall be the reaction.

Digestion: An alkalinizing agent, potassium carbonate salt ($K_2CO_3$), is solubilized in hot water in a jacketed vessel (3). The proportions of the algae and salt are, per 2 liters of water: 1 Kg of ground *Macrocystis* and 10 g of $K_2CO_3$. The perforated basket (16) of freshly-ground *Macrocystis* is immersed in a jacketed vessel (3). The dry, ground algae *Ulva* is added and mixed. The solution pH is controlled (near to pH 10), at a temperature of 65±5° C., for a time of 2 hr, under constant stirring (mixer 17), for obtaining a high extraction yield of potassium alginate. In this step, a neutralization reaction occurs between the alginic acid comprised in the algal particles and the potassium alkali, which produces potassium alginate in aqueous solution.

The reaction carried out is as follows:

$$HAlg + K_2CO_3 \rightarrow KAlg + CO_2 + H_2O$$

This reaction is important since to a large extent the yield and quality of the final product depends on the control of the physical-chemical parameters that are involved therein.

pH measurement: Immediately after the digestion step is finished, the pH is reduced with an acid agent, phosphoric acid ($H_3PO_4$) from pH of about 9-5-10 to pH 4.5–6.2 at a temperature of about 50° C., for achieving better stabilisation of the final product.

Filtering: Using a plate and frame filter-press (7) using a cellulose media as a filtering media. An objective of the filtration is to clarify the pH-adjusted extract solution by removing the non-soluble particles that remain after the digestion.

Storage: Using fiberglass vats (8, 9, 10 and 11) the fertilizer solution product is allowed to cool for approximately between 1 to 2 days. Storage includes avoiding any kind of contamination, damage or deterioration of the product, while it is not dispatched, and controlling its environmental conditions: temperature and exposure to light.

Packing: The liquid fertilizer complement product is packaged into plastic containers for its subsequent transport and distribution. It is necessary to note the importance of the packaging as an aspect of the quality in the product delivery, since it is the main way of maintaining quality in the distributed products.

FIG. 3 components 4–6, 14, 15 and 18–21 are additional parts of the process equipment system.

The fertilizer complement can further comprise mineral elements, aminoacids, vitamins and auxin- and cytokinin-type phytohormones, based on the marine algae *Ulva* and *Macrocystis* contributions.

The fertilizer complement according to the present invention comprises algal particles as well as some inorganic compounds as indicated in Table 1, wherein are showed the percentages of these components on 100 L of the final product.

The obtained product, prepared from "organic" sources and the process above described, is able to provide plant growing certifiable for for being used in organically grown food crops. Thus the fertilizer complement can be added to plants growing media in order to provide a growth stimulator source which complies with "organic" standards for organically grown food.

As stated above, it is highly desirable to obtain a product which meets with the requirements established in the organic standards: EU N°2092/1; USDA/NOP Final rule (USA), and the JAS Japanese Agricultural standard for Organic Agricultural Products (Japan).

Thus, as an organic product for being applied to organically grown food, it is necessary to guarantee that the obtained final product is free of toxic elements, specifically heavy metals, which are hazardous for living beings. Table 2 shows the level of arsenic, mercury and cadmium contained in the final product according to the present invention, wherein said levels have been measured by atomic absorption spectroscopy.

According to the mentioned standards, the heavy metals content, specifically As, Hg, and Cd, must not be higher than 5%. The product of the instant invention fulfills satisfactorily these requirements.

TABLE 1

| Fertilizer Complement Ingredients | % |
|---|---|
| *Macrocystis* and *Ulva* algal particles | 56 |
| Water | 43 |
| hydrochloric acid | <0.01 |
| potassium carbonate | 0.6 |
| phosphoric acid | 0.3 |
| potassium sorbate | 0.1 |

TABLE 2

HEAVY METALS COMPOSITION FOR THE ORGANIC COMPLEMENT FERTILIZER

| Maximun allowed by the EEC | Arsenic* 10 (mg/kg) | Mercury* 1 (mg/kg) | Cadmium* 1 (mg/kg) |
|---|---|---|---|
| *Ulva* | 1.03 | 0.01 | 0.91 |
| *Macrocystis* | 0.24 | 0.00 | 0.24 |
| Final product | 0.05 | 0.00 | 0.02 |

*Atomic absorption spectroscopy, mean value of duplicated samples

EXAMPLE

In a preferred embodiment of the invention, a vessel is provided with water (100 L) at a temperature of about 40–60° C. and 1.25 liters of 0.2 N HCl. 50 kg of minced *Macrocystis* is added and stirred during 30–40 minutes. The residual liquid is removed and the solid is ground and then incorporated into a second vessel with water (200 liters), potassium carbonate (1 kg) and minced *Ulva* (50 kg) for 2 to 2½ hours at a temperature between 60–70° C. After filtering, the pH is lowered to between 4.5–6.2 with phosphoric acid, to produce the resulting liquid fertilizer complement.

The invention claimed is:

1. A process for making a fertilizer complement, wherein an organic vegetal growth stimulator is obtained from *Ulva* and *Macrocystis* algae, comprising the steps of:
   a) acidifying the *Macrocystis* with an acidifying agent,
   b) providing *Ulva* algae, and
   c) digesting the acidified *Macrocystis* and the *Ulva* with an alkalinizing agent to obtain said fertilizer complement.
2. The process according to claim 1, wherein the growth stimulator comprises auxin phytohormones and cytokinin phytohormones.
3. The process according to claim 1, wherein the *Ulva* algae comprises *Ulva rigida* and the *Macrocystis* algae comprises *Macrocystis pyrifera*.
4. The process according to claim 1, wherein the acidifying agent comprises 0.2 N hydrochloric acid.
5. The process according to claim 1, wherein the alkalinizing agent is potassium carbonate ($K_2CO_3$).
6. The process according to claim 1, comprising the steps of:
   1) receiving fresh algae *Macrocystis* and receiving algae *Ulva*,
   2) grinding the alga *Ulva*,
   3) weighing the fresh *Macrocystis* and *Ulva* algae,
   4) washing the fresh *Macrocystis* in water,
   5) mincing the washed *Macrocystis*,
   6) treating the minced *Macrocystis* with an acidifying agent,
   7) draining the residual liquid and separating the solid, minced *Macrocystis*,
   8) optionally washing the solid, minced *Macrocystis* with cold water,
   9) optionally grinding the washed *Macrocystis*,
   10) digesting the freshly ground *Macrocystis* with a potassium carbonate solution under stirring and admixing the dry ground *Ulva*,
   11) adjusting the pH of the digested mixture to acidic with phosphoric acid,
   12) filtering the digested mixture;
   13) optionally storing the filtered solution for 1 to 2 days, and
   14) optionally packaging the resulting product in plastic containers.
7. The process according to claim 6, wherein the weight ratio of *Macrocystis* to *Ulva* in step 3 is 1:1.
8. The process according to claim 6, wherein the weight ratio of *Macrocystis* to *Ulva* in step 10 is up to 10:1 when the *Ulva* is in a dried state.
9. The process according to claim 7, wherein the step of washing results in a low electric conductivity in the washed *Macrocystis*.
10. The process according to claim 6, wherein the step of grinding the *Ulva* reduces the size of the *Ulva* to about 0.2 m.
11. The process according to claim 6, wherein the particle size of the *Macrocystis* in step 5) is about 1 cm and in step 9) is about 0.4 cm.
12. The process according to claim 4, wherein the ratio of ingredients is: water (200 L): *Macrocystis* (100 kg): 0.2 N HCl (2.5 L).
13. The process according to claim 12, wherein the acidifying step is carried out with 0.2 N hydrochloric acid for 30–40 minutes at 50° C. with constant stirring.
14. The process according to claim 6, characterized in that the ratio of ingredients is: water (400 L): algae mixture (200 kg): $K_2CO_3$ (2 kg).
15. The process according to claim 14, characterized in that step 10 is carried out with $K_2CO_3$ for 2 hours at 65±5° C. with constant stirring.
16. The process according to claim 15, characterised in that the digestion achieves a pH value of about 10±0.2, allowing to obtain high extraction yields of potassium alginate.
17. The process according to claim 6, wherein the final pH value of the product is regulated with technical grade phosphoric acid ($H_3PO_4$).
18. The process according to claim 14, wherein the final pH value of the product is about 4.5 to 6.2 in order to achieve an improved stabilization.
19. The process according to claim 6, characterized in that the final product is filtered through a plate and frame press-filter using filtration media cellulose covers.
20. A fertilizer complement obtained by the process of claim 1.
21. The fertilizer complement according to claim 20, further comprising mineral elements, amino acids, vitamins and auxin phytohormones and cytokinin phytohormones based on the marine algae *Ulva* and *Macrocystis*.

* * * * *